United States Patent [19]

Hehn

[11] Patent Number: 4,987,999

[45] Date of Patent: Jan. 29, 1991

[54] VIDEOCASSETTE STORAGE AND DISPLAY SLEEVE

[75] Inventor: Bruce A. Hehn, Massillon, Ohio

[73] Assignee: Alpha Enterprises, Inc., East Canton, Ohio

[21] Appl. No.: 468,086

[22] Filed: Jan. 22, 1990

[51] Int. Cl.$^5$ ............................................. B65D 85/672
[52] U.S. Cl. .................... 206/387; 206/459; 206/815; 206/45.34
[58] Field of Search ............... 206/1.5, 45.31, 45.34, 206/387, 815, 424, 459; 229/9, 10, 11

[56] References Cited

U.S. PATENT DOCUMENTS

| Re. 32,296 | 11/1986 | Wynalda | 206/387 |
|---|---|---|---|
| 3,403,714 | 10/1968 | Hulm | 208/815 |
| 3,664,492 | 5/1972 | Wallace | 206/387 |
| 3,828,922 | 8/1974 | Holkestad | 206/1.5 |
| 3,912,077 | 10/1975 | Krynicki | 206/387 |
| 4,043,448 | 8/1977 | Tanaka | 206/1.5 |
| 4,098,402 | 7/1978 | Rogg | 206/387 |
| 4,125,189 | 11/1978 | Fujimoto et al. | 206/387 |
| 4,240,551 | 12/1980 | Osanai | 206/387 |
| 4,284,204 | 8/1981 | Carey, Jr. | 206/1.5 |
| 4,361,233 | 11/1982 | Holkestad | 206/387 |
| 4,365,712 | 12/1982 | Oishi et al. | 206/387 |
| 4,381,836 | 5/1983 | Rivkin et al. | 206/387 |
| 4,501,359 | 2/1985 | Yoshizawa | 206/45.34 |
| 4,545,483 | 10/1985 | Shiba et al. | 206/387 |
| 4,634,004 | 1/1987 | Mortensen | 206/387 |
| 4,635,797 | 1/1987 | Bankier | 206/472 |
| 4,784,264 | 11/1988 | Sykes | 206/387 |
| 4,789,058 | 12/1988 | Blaney | 206/232 |
| 4,802,601 | 2/1989 | Pijanowski et al. | 220/4 R |

FOREIGN PATENT DOCUMENTS

| 182721 | 5/1986 | European Pat. Off. | 206/387 |
|---|---|---|---|
| 2700556 | 1/1978 | Fed. Rep. of Germany | 206/387 |
| 3123193 | 12/1982 | Fed. Rep. of Germany | 206/387 |
| 178033 | 9/1985 | Japan | 206/387 |

*Primary Examiner*—David T. Fidei
*Attorney, Agent, or Firm*—Michael Sand Co.

[57] ABSTRACT

A sleeve for storing and displaying a videocassette comprising a clear plastic, elongated rectangular one-piece member formed with a hollow interior storage chamber completely enclosed except for an end opening through which a videocassette is inserted into and removed from the chamber. A chipboard cover having printed indicia thereon identifying a pre-recorded program on the videocassette is retained within the chamber and slidably receives the videocassette therein. A pair of diametrically-disposed interiorly-facing lug member is formed on the front and rear walls of the sleeve and extend into the end opening to retain the videocassette within the chipboard sleeve. Aperture means is formed in the rear wall of the sleeve to permit removal of the videocassette from the sleeve. Such aperture means comprises one or more finger holes to permit application of finger pressure on the videocassette to overcome the frictional engagement of the videocassette by the lug means. The chipboard cover can be retained in the sleeve by the lug means upon removal of the videocassette from the sleeve.

10 Claims, 2 Drawing Sheets

VIDEOCASSETTE STORAGE AND DISPLAY SLEEVE

BACKGROUND OF THE INVENTION

1. Technical Field

The invention relates to videocassette containers, and in particular to a sleeve for storing and displaying a videocassette. More particularly, the invention relates to such a sleeve for storing and displaying a videocassette in which the videocassette can be quickly and easily slidably inserted into and removed from the sleeve and in which a chipboard cover having printed indicia thereon identifying a prerecorded program on the videocassette remains in the sleeve upon removal of the videocassette therefrom.

2. Background Information

Rentals of videocassettes having prerecorded programs thereon such as popular movies, exercise routines, etc., continue to increase as the number of homes having videocassette recorders/players increases. As videocassette rentals and the number of program titles available on videocassette continue to increase, owners of stores which rent the videocassettes continue to strive for more efficient ways of storing and displaying the videocassettes.

The current practice in most videocassette rental stores is to display chipboard covers or boxes having printed indicia thereon identifying the prerecorded programs on the videocassettes, on shelves in areas of the store to which the public has access. Customers then are free to browse through the boxes to assist them in choosing which videocassettes to rent. After choosing a particular prerecorded program which a customer desires to view, he/she either takes the empty chipboard box for that videocassette from the shelf or some other means of identification such as a code number tag corresponding to the videocassette, to a store employee stationed behind a counter. The employee then retrieves the desired videocassette from a storage area behind the counter or from a remote room and completes the rental transaction. The customer usually takes the rented videocassette home in a usual videocassette storage container of a type which is well-known in the art and which has a lid for complete closure of the container.

Such a system requires owners of videocassette rental stores to not only provide enough floor space for public display of the information-bearing chipboard or cardboard boxes so that customers can choose the prerecorded programs which they wish rent, but also to provide adequate behind-the-counter inventory areas for storing the actual videocassettes. In addition, the public is continually handling the chipboard boxes when browsing through the store to choose the videocassettes, and eventually the boxes wear out. If the store has bought only a single copy of a particular videocassette program title and its box wears out, the only way to replace the box is to buy an additional copy of the videocassette, which could be a needless increase of inventory costs, especially for infrequently rented videocassettes. Also, most rental store owners typically resell their videocassettes after approximately six months of customer use. To help enhance the resale value of the used videocassettes, they are placed in the chipboard boxes in which they were originally shipped from the videocassette manufacturer to the rental store owner, and shrink-wrapped. However, excessively handled and worn boxes further reduces the attractiveness of the already-used videocassettes as a resale item.

My invention would enable the videocassette rental store owner to display the information-bearing chipboard boxes in a protective transparent sleeve with or without the actual videocassette therein. If theft of the videocassettes is not a concern in a particular store, the owner may desire to place the videocassettes within the sleeve together with its corresponding chipboard box, and display the sleeve on a shelf to which the public has access. A customer then simply would remove the sleeve from the shelf and take the same to an employee at a counter for completing the rental transaction. The customer could transport the videocassette home in the sleeve, or the employee could remove the videocassette from the sleeve and place the videocassette in a usual completely enclosed videocassette storage container for transport to the customer's home.

In stores where theft is a problem, the owner may choose merely to place the sleeve containing only the chipboard box on the public access shelves. A customer desiring to rent a particular videocassette would take the sleeve and chipboard box to an employee at the counter who would then complete the rental transaction, either utilizing the sleeve for transport of the videocassette to the customer's home or allowing the customer to take the videocassette home in a usual lid-type videocassette storage container. Thus, these alternate systems not only preserve the chipboard boxes, but the former system could also significantly reduce behind-the-counter storage space.

Therefore, the need exists for a videocassette storage and display sleeve which stores and displays a videocassette and/or its corresponding chipboard cover having printed indicia thereon identifying a prerecorded program on the videocassette, and which enables the videocassette to be quickly and easily inserted into and removed from the sleeve while the chipboard cover remains in the sleeve.

SUMMARY OF THE INVENTION

Accordingly, it is a primary objective of the invention to provide a videocassette storage and display sleeve in which a videocassette can be quickly and easily inserted into and removed from the sleeve by mere application of pressure by a finger of a user inserted into the rear of the sleeve.

Another objective of the invention is to provide a videocassette storage and display sleeve in which a chipboard cover having printed indicia thereon identifying a prerecorded program on the videocassette is retained within the sleeve and slidably receives the videocassette therein, the chipboard cover remaining in the sleeve upon removal of the videocassette therefrom.

A further objective of the invention is to provide such a videocassette storage and display sleeve which protects the chipboard cover and/or videocassette contained therein from excessive handling and resultant wear or damage.

A still further objective of the invention is to provide such a videocassette storage and display sleeve which enables the owner of a videocassette rental store to operate with less space by placing the sleeve containing the chipboard cover and its corresponding videocassette in public access areas and eliminating the need for behind-the-counter storage areas.

Still another objective of the invention is to provide such a videocassette storage and display sleeve within which a videocassette can be transported to a customer's home for viewing.

These objectives and advantages are obtained by the hollow sleeve for storing and displaying a videocassette of the invention, the general nature of which may be stated as including, a pair of spaced parallel front and rear walls, and a pair of spaced parallel sidewalls forming a generally rectangular-shaped storage chamber, with the walls being formed of plastic material and at least the front wall being transparent; the sleeve having first and second ends, with the first end being formed with a generally rectangular-shaped opening through which a videocassette can be slidably inserted into and removed from the storage chamber, and the second end being formed with stop means for generally retaining the videocassette within the storage chamber; and a pair of lug means formed integrally with certain of the walls adjacent to, and projecting interiorly into, the first end opening for partially blocking the opening to retain the videocassette in the storage chamber. The lug means permit frictional engagement of the videocassette and its chipboard cover within the sleeve for separate removal of the videocassette and/or chipboard cover by one or more apertures in the rear wall of the sleeve. The aperture permits finger penetration into the sleeve for removal of the videocassette and/or the chipboard cover.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

DESCRIPTION OF THE PREFERRED EMBODIMENT

Figure 1:
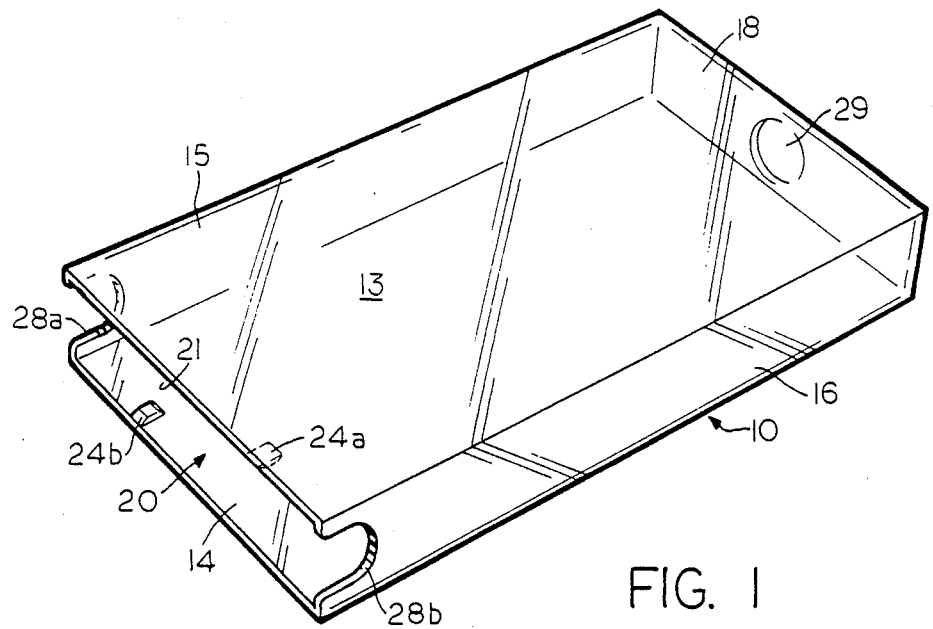
FIG. 1 is a perspective view of the empty storage and display sleeve of the present invention.

The sleeve for storing and displaying a videocassette of the present invention, is indicated generally at 10 as shown in FIG. 1. Sleeve 10 is intended for storing and displaying a usual videocassette 11 of a type which is well-known in the art, and/or the chipboard cover or box 12 of a type also well-known in the art and having printed indicia thereon identifying the prerecorded program contained on the videocassette.

Figure 2:
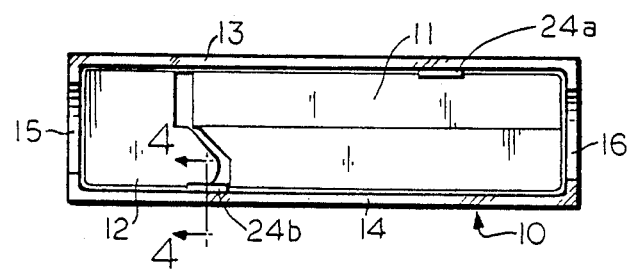
FIG. 2 is an open end view of the sleeve with the cover and videocassette contained therewithin.
Figure 4:
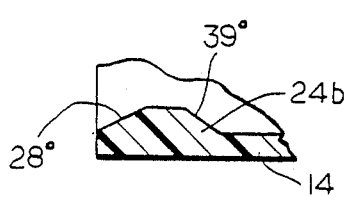
FIG. 4 is a fragmentary sectional view of one lug member taken along the line 4—4 of FIG. 2.
Figure 3:
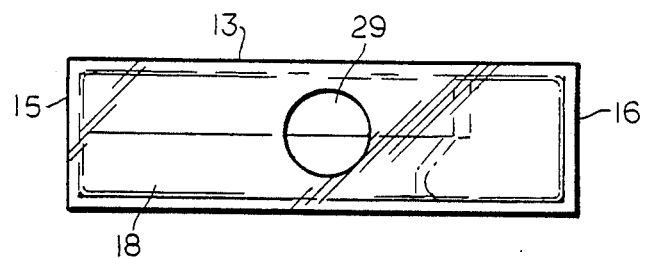
FIG. 3 is a closed end view of the sleeve with the cover and videocassette in dotted outline.
Figure 5:
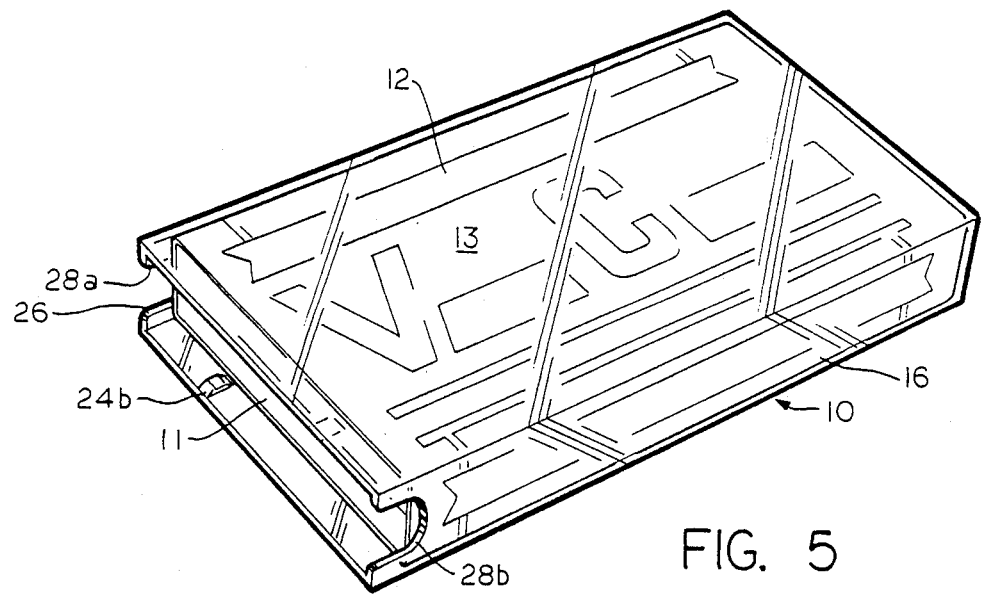
FIG. 5 is a perspective view of the sleeve containing the cover and videocassette retained therewithin.
Figure 6:
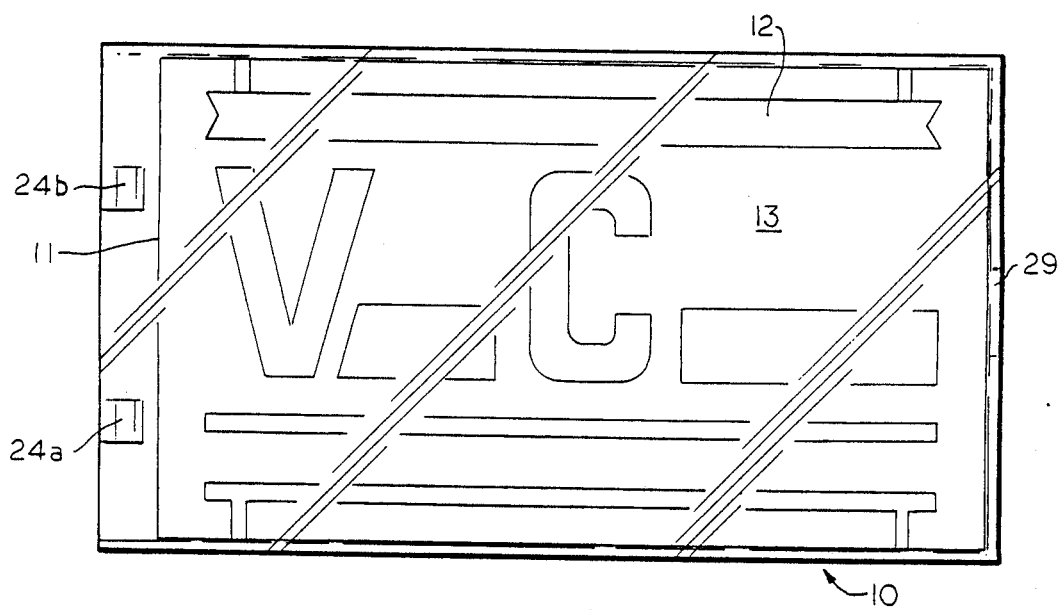
FIG. 6 is a top plan view of the sleeve, cover and videocassette in combined relation.
Figure 7:
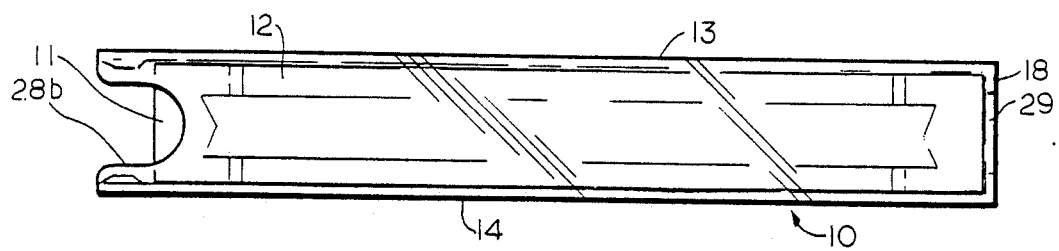
FIG. 7 is a side view of the combined members shown in FIGS. 5 and 6.

Sleeve 10 comprises a pair of spaced parallel front and rear walls 13 and 14, respectively, a pair of spaced parallel sidewalls 15 and 16, and a rear wall 18 which extends between and is connected to the front wall, rear wall, and sidewalls adjacent to one of the ends of sleeve 10 to close the end (FIG. 1). Front wall 13, rear wall 14, sidewalls 15 and 16, and rear end wall 18, form a generally rectangular-shaped storage chamber 20. The edges of walls 13 to 16 on the end of sleeve 10 opposite from end wall 18 define a generally rectangular-shaped opening 21 in the sleeve 10 as shown in FIG. 2 which communicates with storage chamber 20 for slidably inserting a videocassette 11 into and removing it from the storage chamber.

In accordance with one of the main features of the present invention, a pair of inwardly-facing generally similarly-shaped lug members 24a and 24b is formed on the edges of front and rear walls 13 and 14 adjacent to end opening 21. Lug or rib members 24a and 24b extend partially into end opening 21 preferably in diametrically-opposed relation for partially blocking the opening to retain videocassette 11 in storage chamber 20. The lugs or ribs also serve to retain the chipboard cover 12 in intermediate relation between the sleeve 10 and the videocassette 11.

The sidewalls 15 and 16 have semi-circular openings 28a and 28b adjacent to the end opening 21. The similarly-shaped side openings 28a and 28b permit finger access to the front side edges of the videocassette when it is pushed from the sleeve by finger access through at least one finger-hole opening 29 in the rear wall 14 of the sleeve. Pushing the cassette by finger pressure through the opening 29 overcomes the frictional retention force exerted on the cover 12 and inner videocassette 11 for ready removal of the latter from the sleeve. The cover is retained in the sleeve by the lugs 24a and 24b to identify the sleeve for replacement of the videocassette when required for combination with its cover and sleeve.

Sleeve 10 preferably is formed of transparent polystyrene, polypropylene, polyethylene, or other plastic material utilizing either a blow molding or injection molding process for its formation. The term transparent as used throughout means a "water clear" or "contact" transparency, so long as the graphics on chipboard box 12 is visible through sleeve 10. The sleeve may be formed of rigid, semi-rigid or flexible plastic material. Sleeve 10 preferably is formed of two rigid members sonicly welded together or may be formed of a single semi-rigid injection molded member. Walls 13–18 preferably have a general uniform thickness ranging from about 0.020 and 0.070 inch, with lug as its maximum height ranging from about 1/32 and ¼ inch. The overall dimensions of sleeve 10 include a length within the range of 7¼ and 8 inches, a width within the range of 4 1/16 and 4⅜ inches, and a height within the range of 1 and 1¼ inches.

Videocassette storage and display sleeve 10 of the present invention is used in the following manner. Video rental stores normally purchase large numbers of videocassettes 11 having prerecorded programs thereon such as popular movies, exercise routines, etc., from the manufacturer or a distributor thereof. These videocassettes typically then are rented out to the public for a fee. A new videocassette is placed in the rental cycle for approximately six months, afterwhich it is sold for addition to a customer's home video library and then replaced with another new videocassette. The manufacturer typically packages the videocassettes in a flexible cardboard or chipboard box 12 having identifying indicia thereon, such as photographs and written summaries, for identifying the prerecorded program contained on the videocassette. The closure end flaps on one or both ends of chipboard box 12 are removed at the rental facility and the chipboard box is placed in storage and display sleeve 10. More specifically, box 12 is located within storage chamber 20 of sleeve 10 and conforms to the interior of sleeve walls 13 through 16 which define the chamber, and is configured to slidably receive videocassette 11 therein through its open end.

When a user desires to insert or remove videocassette 11 into or from sleeve 10, sidewalls 13 and 14 bearing the interior pair of lug members 24a and 24b serve to frictionally retain the videocassette 11 and chipboard box 12 within the sleeve. The lugs have a maximum height ranging from about 1/32 to ¼ inch and sloping surfaces to facilitate smooth ingress and egress of the videocassette 11 and chipboard cover 12. The lugs are contoured similarly so that when finger pressure is applied to the videocassette it may be forced against and beyond the retentive pressure applied by its exterior surfaces on the lugs. The blocking pressure is overcome by the longitudinal pressure applied through the opening 29 in rear end wall 18 by the user's finger pressure.

The practical and preferred use of sleeve 10 in a video rental store is as follows. Sleeve 10 containing box or cover 12 and videocassette 11, as shown in FIG. 1, is placed on a shelf in a public access area of the store so that a customer wishing to rent one or more videocassettes may determine what is contained on a videocassette 11 by viewing the information printed on the box 12 through the transparent walls of the sleeve. When the customer has determined that he wishes to rent a particular videocassette, he merely takes the sleeve containing the desired videocassette to a counter where an employee will complete the rental or review transaction. Then, the videocassette can be removed from the store and transported to the customer's home or facility in the sleeve. When the customer desires to view the videocassette, he merely grasps the sidewalls of the sleeve adjacent to rear end opening with a thumb and a finger and pushes the videocassettes 11 from the sleeves enabling the videocassettes to be removed from storage chamber 20. However, chipboard box or cover 12 is retained within the sleeve due to its frictional fit within the sleeve walls. Videocassette 11 also can be removed from sleeve 10 and chipboard box 12 by a sharp rap of the open end of sleeve 10 against a users hand. This will enable videocassette 11 to slide out through end opening 21.

It can be seen that this system of storing and displaying videocassettes has several advantages. First, when customers browse through the store in choosing which videocassettes to rent, the sleeve protects the box and videocassette from wear and damage from constant handling. More particularly, this enables the video store owner to sell the used videocassette in its original, fresh-looking chipboard box after the typical six-month rental life of the videocassette has elapsed. Moreover, the sleeve enables the videocassette and box to be stored and displayed together, thereby eliminating the need for behind-the-counter storage areas for the videocassettes separate from their corresponding chipboard boxes in the display area of the store. Also, the sleeve can be used to safely transport a rented videocassette to a customer's home or a facility for viewing.

It is important to note that the inventor has contemplated applying an electronic source means of a type which is well-known in the art to the sleeve, to be used in combination with electronic detector means positioned at the exit area of the video rental store to discourage and prevent shoplifting of the videocassettes. If theft is an extremely serious problem in a particular store, the cassettes merely can be stored behind the counter in any suitable manner such as in usual videocassette cases of a type which are well-known in the art, with the sleeve and chipboard box contained therein being displayed in public access areas. This system would still protect the box from wear, but would not eliminate the need for storage space for the videocassettes.

Again, the main feature of the videocassette storage and display sleeve of the present invention is the construction of sleeve 10 from a clear flexible plastic which enables the sleeve to protectively display the chipboard boxes, but also to be used as an effective storage and transport device for videocassettes which can be quickly and easily inserted into and removed from the sleeve.

In summary, the videocassette storage and display sleeve of the invention enables a videocassette to be quickly and easily inserted into and removed from the sleeve by mere application of pressure by a thumb and a finger of a user to the sleeve. Moreover, a chipboard cover having printed indicia thereon identifying a pre-recorded program on the videocassette is retained within the sleeve and slidably receives the videocassette therein, and remains protected in the sleeve upon removal of the videocassette therefrom. The sleeve protects the chipboard cover and videocassette contained therein from excessive handling and resultant wear or damage. Thus, the owner of a videocassette rental store can operate with less space by placing the sleeve containing the chipboard cover and its corresponding videocassette in public access areas and eliminating behind-the-counter storage areas for the videocassettes. The sleeve also can be used to transport rented videocassettes to a customer's home for viewing.

Accordingly, the improved videocassette storage and display sleeve is simplified, provides an effective, safe, inexpensive, and efficient sleeve which achieves all the enumerated objectives, provides for eliminating difficulties encountered with prior containers, and solves problems and obtains new results in the art.

In the foregoing descriptions, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved videocassette storage and display sleeve is constructed and used, the characteristics of the construction, and the advantageous, new and useful results obtained; the new and useful structures, devices, elements, arrangements, parts and combinations, are set forth in the appended claims.

What is claimed is:

1. A sleeve for storing and displaying a videocassette comprising a pair of spaced parallel front and rear walls, and a pair of spaced parallel sidewalls forming a generally rectangular-shaped storage chamber, with said walls being formed of plastic material with at least the front wall being transparent: said sleeve having first and second ends, with the first end being formed with a generally rectangular-shaped opening through which a videocassette can be slidably inserted into and removed from said storage chamber, and the second end being formed with stop means for generally retaining the videocassette within said storage chamber and aperture means formed contiguous with said stop means in said second end; a hollow flexible cover having printed indicia thereon identifying a prerecorded program on the videocassette disposed within said storage chamber of the sleeve and conforming to the interior of said sleeve walls defining said chamber and configured to slidably receive the videocassette therein; and internal lug means formed integrally with certain of the walls adjacent to said first end opening for engaging a front end of the cassette and the flexible cover to maintain said cassette and cover within the storage chamber, with said aperture means allowing penetration of said stop means with finger pressure to remove the videocassette from said storage chamber past the lug means, with said lug means maintaining the flexible cover behind in the storage chamber.

2. The sleeve in accordance with claim 1 wherein the said stop means is an end wall extending between and connecting the said front wall, rear wall and sidewalls at said second end of said sleeve to close the same except for said aperture means.

3. The sleeve in accordance with claim 1, wherein the said cover is formed of chipboard and includes at least one open end.

4. The sleeve in accordance with claim 1 wherein the said lug means comprises a pair of interiorly facing raised lug members disposed in diametrically-opposed relation within said first end opening with essentially sloping edges adapted to retain said videocassette within said storage chamber.

5. The sleeve in accordance claim 1 wherein the said lug means are diametrically-disposed in interiorly-facing relation on the front and rear walls of said sleeve closely adjacent said first end opening.

6. The sleeve in accordance with claim 1 wherein the said lug means have a similar configuration and a height ranging from about 1/32 to $\frac{1}{4}$ inch to facilitate retention and removal of said videocassette from said storage chamber.

7. The sleeve in accordance with claim 1 wherein the length of the sleeve ranges from about $7\frac{1}{4}$ to 8 inches, the width of the sleeve ranges from about $4\frac{1}{8}$ to $4\frac{5}{8}$ inches, and the height of the sleeve ranges from about 1 to $1\frac{1}{4}$ inches.

8. The sleeve in accordance with claim 1 in which the sleeve is formed entirely of transparent plastic material.

9. The sleeve in accordance with claim 1 in which the sleeve is formed of rigid polystyrene material.

10. The sleeve in accordance with claim 1 wherein the said aperture means comprises at least one finger opening in said rear wall stop means to permit removal of said videocassette from said storage chamber by overcoming frictional retention of said videocassette by said lug means.

* * * * *